(12) United States Patent
Hudson

(10) Patent No.: US 9,176,489 B2
(45) Date of Patent: Nov. 3, 2015

(54) CONTROL APPARATUS FOR AUTOMATING THE OPERATION OF MACHINERY

(71) Applicant: Adam Hudson, Princeton, IN (US)

(72) Inventor: Adam Hudson, Princeton, IN (US)

( * ) Notice: Subject to any disclaimer, the term of this patent is extended or adjusted under 35 U.S.C. 154(b) by 421 days.

(21) Appl. No.: 13/761,513

(22) Filed: Feb. 7, 2013

(65) Prior Publication Data

US 2014/0222172 A1    Aug. 7, 2014

(51) Int. Cl.
| | | |
|---|---|---|
| *G08G 1/123* | (2006.01) | |
| *G05D 1/00* | (2006.01) | |
| *G05D 3/00* | (2006.01) | |
| *G01M 17/00* | (2006.01) | |
| *G05B 15/02* | (2006.01) | |

(52) U.S. Cl.
CPC ..................................... *G05B 15/02* (2013.01)

(58) Field of Classification Search
CPC ......... G01S 19/14; G01S 19/38; G01S 19/39; G01S 19/42; G01S 19/45; G01S 19/46
USPC ......... 340/988, 995.1; 701/1, 32.3, 32.4, 400, 701/412, 468, 487, 491, 526, 541
See application file for complete search history.

(56) References Cited

U.S. PATENT DOCUMENTS

| | | | | |
|---|---|---|---|---|
| 6,199,000 | B1 * | 3/2001 | Keller et al. ..................... | 701/50 |
| 6,804,587 | B1 * | 10/2004 | Connor et al. ................... | 701/26 |
| 6,876,920 | B1 * | 4/2005 | Mailer ........................... | 701/470 |
| 6,880,643 | B1 * | 4/2005 | Zimmerman et al. ........ | 172/4.5 |
| 7,200,490 | B2 * | 4/2007 | Lange et al. .................... | 701/23 |
| 7,225,060 | B2 * | 5/2007 | O'Connor et al. ............... | 701/1 |
| 7,256,388 | B2 * | 8/2007 | Eglington et al. ............ | 250/221 |
| 7,451,030 | B2 * | 11/2008 | Eglington et al. ............. | 701/50 |
| 7,561,967 | B2 * | 7/2009 | Lawrence et al. ............ | 701/469 |
| 7,689,356 | B2 * | 3/2010 | Dix et al. ...................... | 701/425 |
| 7,898,470 | B2 * | 3/2011 | Heraud et al. ........... | 342/357.25 |
| 7,908,062 | B2 * | 3/2011 | Corcoran ...................... | 701/50 |
| 8,244,434 | B2 * | 8/2012 | Matthews ..................... | 701/42 |
| 8,374,790 | B2 * | 2/2013 | Gould et al. .................. | 701/533 |
| 8,494,726 | B2 * | 7/2013 | Peake et al. .................... | 701/50 |
| 8,583,326 | B2 * | 11/2013 | Collins et al. .................. | 701/41 |
| 8,649,930 | B2 * | 2/2014 | Reeve et al. ................... | 701/24 |
| 2006/0025894 | A1 * | 2/2006 | O'Connor et al. .............. | 701/1 |
| 2006/0178825 | A1 * | 8/2006 | Eglington et al. ............ | 701/211 |
| 2006/0271348 | A1 * | 11/2006 | Rossow et al. ................ | 703/26 |
| 2010/0250123 | A1 * | 9/2010 | Leman .......................... | 701/208 |
| 2012/0109463 | A1 * | 5/2012 | Elkins et al. ................... | 701/42 |
| 2012/0191349 | A1 * | 7/2012 | Lenz et al. ...................... | 702/2 |
| 2014/0092093 | A1 * | 4/2014 | Murray ......................... | 345/440 |

* cited by examiner

*Primary Examiner* — Ronald Hartman, Jr.

(74) *Attorney, Agent, or Firm* — Gary K. Price

(57) ABSTRACT

A control apparatus consisting of various componentry that are included together in a single, self-contained casing, the control apparatus for providing real time control of machinery and vehicles. The control apparatus includes a casing that defines a storage area therein. An integration card is positioned within the storage area, the integration card including a plurality of management ports. The control apparatus includes a computer processor, a GPS card, a radio card, and an LED light board that are in direct communication with the integration card. The control apparatus further includes a Wi-Fi card and a display screen that are in direct communication with the computer processor of the apparatus. A power surge protector is connected directly to the computer processor and the integration card.

18 Claims, 3 Drawing Sheets

US 9,176,489 B2

CONTROL APPARATUS FOR AUTOMATING THE OPERATION OF MACHINERY

CROSS REFERENCES TO RELATED APPLICATIONS

U.S. Provisional Application Patent No. 61/596,401, filed Feb. 8, 2012 which is hereby incorporated by reference. Applicant claim priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

The present invention generally relates to machinery automation, and more particularly, to an apparatus for providing real time control of machinery.

2. Brief Description of Prior Art

Machinery, such as relatively sophisticated and powerful geography altering, earth-moving, and/or earth-working machinery have been developed to recontour the topography of large tracts of land, or to otherwise alter the geography of a worksite such as a construction area, a mine, a roadbed, an airport runway, and the like. Machinery of this type (e.g., motorgraders and bulldozers) typically include a cutting blade for contouring a tract of earth.

The advent of computer technology and navigational systems such as satellite, laser, and gyroscope methods has led to the development of various control and/or automated mechanisms for various aspects of geography altering operations. For example, the prior art teaches an onboard computer that receives signals from various detection units that are used to control aspects of the operation of the machinery, including controlling the slope of the earth-engaging blade. Such onboard computer system may include, but not be limited to, a computer processor, a GPS (or other similar positioning system), various sensors for providing data input concerning the operation of the machinery, a base receiver typically disposed in communication with a mobile rover receiver, and a display screen, to name a few. These various units are known to be stand-alone units that are typically connected by conventional wiring or cable, but may also be wireless connections that provide for electronic communication. In any event, having a plurality of units housing various components in order to obtain a single objective, namely, controlling various aspects of the operation of the machinery, can be both cumbersome and space limiting.

Despite the advances disclosed in the prior art, there exists a need for an improved automated control apparatus used for automating the operation of machinery or vehicles, and, in particular, a system providing improved efficiency and/or functionality.

SUMMARY OF THE INVENTION

A control apparatus consisting of various componentry that are included together in a single, self-contained casing, the control apparatus for providing real time control of a machinery or vehicle. The control apparatus includes a casing that defines a storage area therein. The control apparatus further includes an integration card positioned within the storage area of the casing. The integration card defines a plurality of management ports to connect and interface the various components contained in the storage area of the control apparatus.

The control apparatus includes a computer processor, at least one GPS card, a radio card, and an LED light board that are in direct communication with the integration card. The control apparatus further includes a Wi-Fi card and a display screen that are in direct communication with the computer processor of the apparatus.

The control apparatus preferably includes a power surge protector that is connected directly to the computer processor and the integration card.

DESCRIPTION OF THE PREFERRED EMBODIMENT

Figure 1:
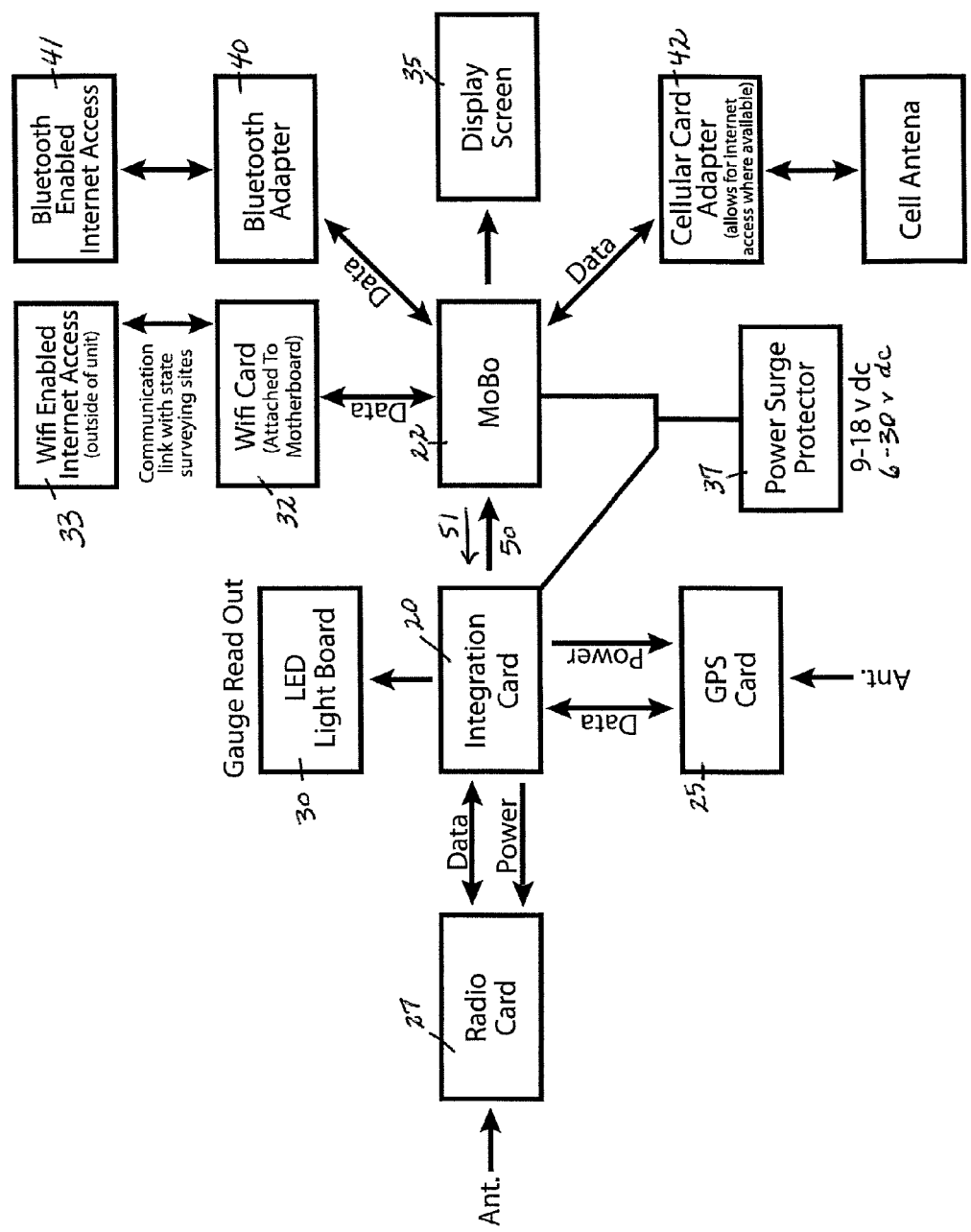
FIG. 1 is a block diagram of the control apparatus of the present invention.

In accordance with the present invention, a control apparatus for automating the operation of machinery and vehicles is disclosed. Specifically, the described apparatus is an onboard system consisting of various componentry that are included together in a single, self-contained casing. In the broadest context, the control apparatus of the present invention consists of components that configures with respect to each other so as to attain the desired objective.

It should be disclosed from the outset that the present invention discloses a control apparatus that generally combines the components that are presently used to control the operation of the selected machinery or vehicle. The present invention does not involve or alter the software and techniques of automating the operation. The present invention is strictly limited to the confinement and combination of the required hardware into a single, self-contained casing in order to more effectively and efficiently obtain the required objectives.

The present invention is now exemplified by a particular embodiment which is illustrated in the accompanying drawing.

Referring to the drawings, the control apparatus of the present invention designated as numeral 10 includes a casing 15 defined by six sides (designated 15A, 15B, 15C, 15D, 15E, and 15F), and a storage area 17 therein. In the preferred embodiment, the casing 15 is constructed of aluminum material. More particularly, in the preferred embodiment, the front and back sides of the casing, 15A and 15C, are constructed of a ⅜" aluminum material; and the sides, top and bottom of the casing, 15B, 15D, 15E and 15F, respectively are constructed of a ¼" aluminum material.

Components within the Storage Area of the Casing

The control apparatus 10 further includes an integration card 20 positioned within the storage area 17 of the casing 15. As will be understood, during operation of the control apparatus 10, ail components that define the control apparatus 10 are either directly or indirectly in communication with the integration card 20.

More particularly, the integration card 20 defines a plurality of management ports (not shown) to connect and interface the various components of the control apparatus 10. As will be understood, the integration card 20 allows integration of the various components within the storage area 17 to a control apparatus for automating the operation of machinery or vehicle.

Figure 3:
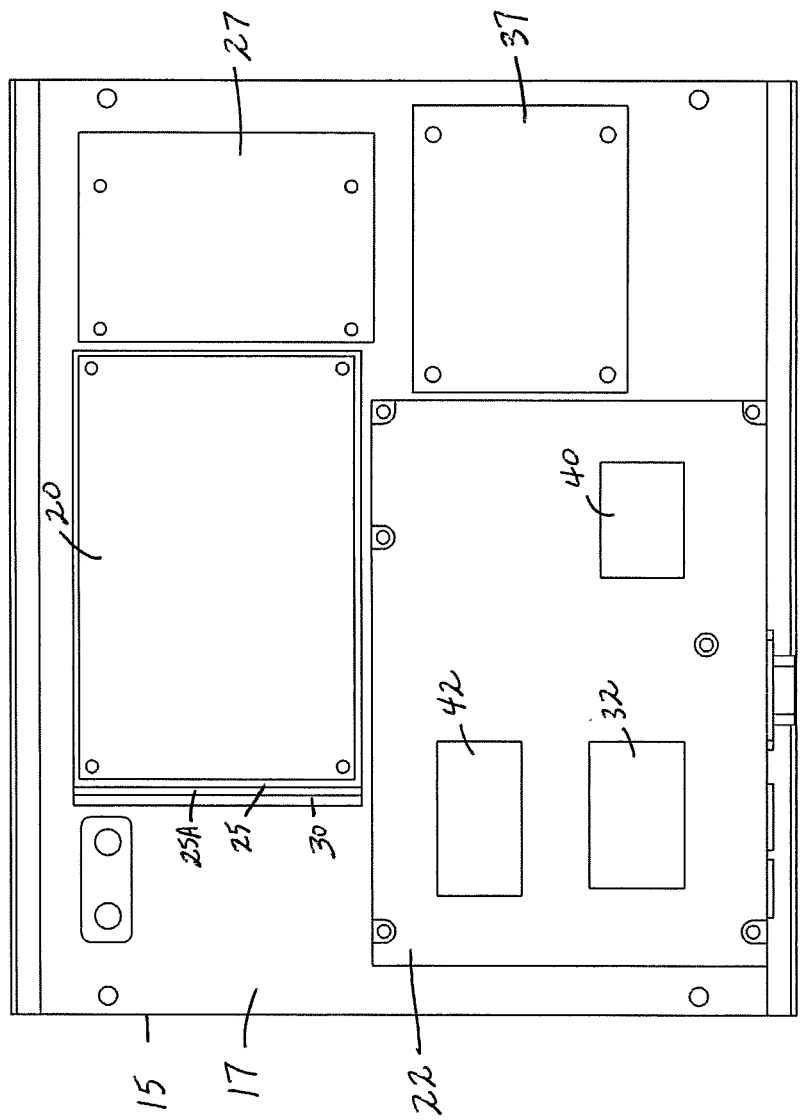
FIG. 3 is a perspective view of the control apparatus of FIG. 2, illustrating the storage area within the casing.

The control apparatus 10 preferably includes a computer processor 22, at least one GPS card 25, a radio card 27, and an LED light board 30. As illustrated in FIG. 3, the computer processor 22, GPS card 25, radio card 27, and light board 30 are in direct communication with the integration card 20, and are each connected to one of the selected management ports on the integration card 20. Such direct communication can be accomplished with conventional wiring or cable.

The control apparatus 10 further includes a Wi-Fi card 32 and a display screen 35. The Wi-Fi card 32 and display screen 35 are in direct communication with the computer processor 22. Such direct communication can be with conventional wiring or cable, but may also be wireless connections.

The control apparatus can further include a power surge protector 37 that is connected directly to the computer processor 22 and the integration card 20.

As is understood, the Wi-Fi card 32 attached to the computer processor 22 can enable the apparatus 10 with internet access 33. In addition, the control apparatus 10 may include a bluetooth adapter 40 that is in communication with the computer processor 22. The bluetooth adapter 40 is a second alternative to enable the apparatus 10 with internet access 41. The control apparatus 10 can further include a cellular card adapter 42 that is in communication with the computer processor 22. The cellular card adapter 42 is a third alternative to enable the apparatus 10 with internet access.

Figure 2:
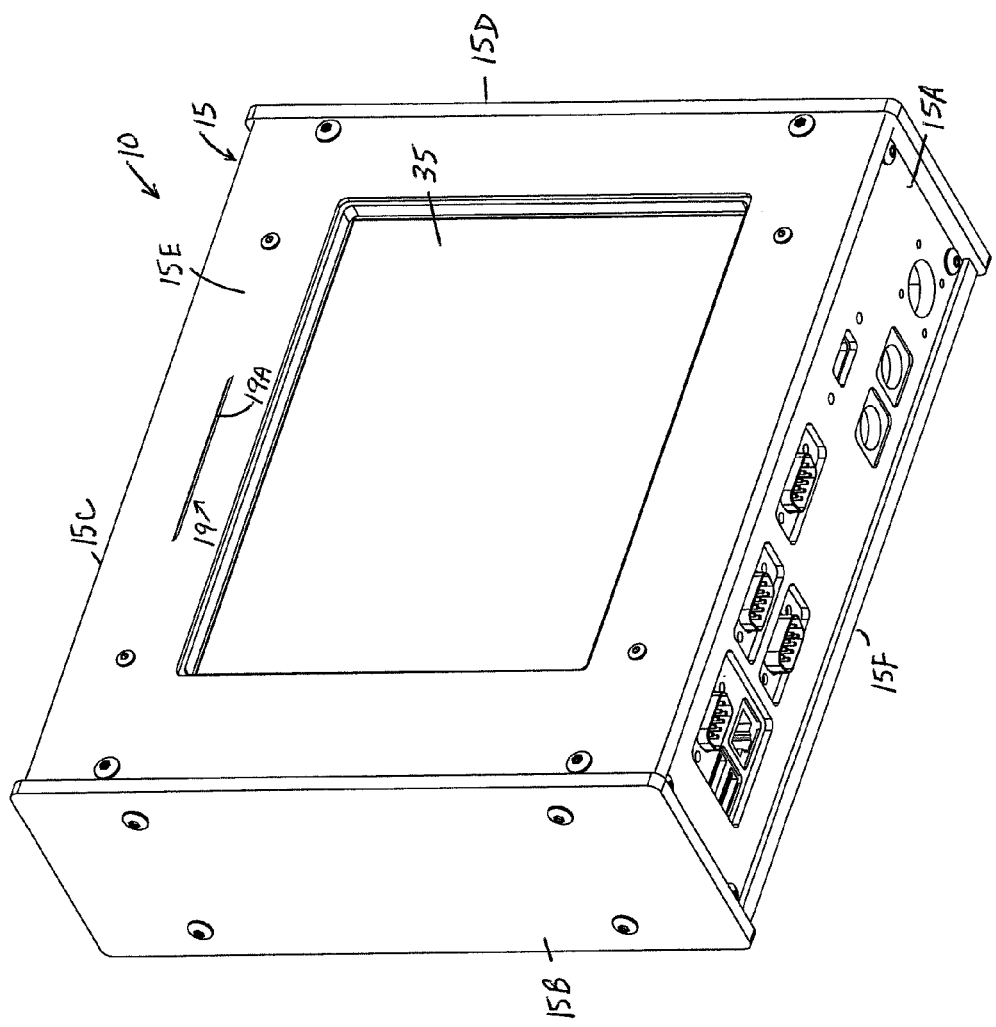
FIG. 2 is a perspective view of a preferred embodiment of the present invention, a control apparatus for automating the operation of machinery.

As shown in FIG. 2, the casing 15 further includes a display 19 having a series of status LEDs 19A. The display 19 is connected to the LED light board 30, and indicates the status of the various components that define the control apparatus 10 during operation. You can confirm operation of each component of the control apparatus 10 by observing the status LEDs 19A on the top surface 15E of the casing 15. The LEDs should be on continuously. If an LED flashes rapidly, the particular component associated with that LED has failed.

In the preferred embodiment, the integration card 20 is appropriately connected to the GPS card 25 and is resting on top of the GPS card 25. Communication is routed through the integration card to the different components of the control apparatus 10 for both sending and receiving data such as, but not limited to, receiving corrections and sending corrected positioning data to the computer processor 22 for processing.

The primary communication 50 is from the GPS card 25 through the integration card 20 such that the GPS card 25 sends position data to the computer processor 22 for processing. A secondary communication 51 is from the computer processor 22 to the GPS card 20. Correction data from the cell phone card 42, blue tooth 40 and Wi-Fi 32 are sent to the GPS 25 for correction calculation, and then ultimately sent through the primary communication.

Secondary communications from the radio 27 to the GPS card 25 with correction data from the radio 27 are sent to the GPS card 25 through the integration card 20. Updated GPS positioning is ultimately sent to the computer processor 22 through the primary communication.

The control apparatus 10 can further include a second GPS card 25A, wherein the first GPS card 25 for determining the position of the earth-working machinery or vehicle (not shown), and the second GPS card 25A for determine positioning of equipment on the vehicle, such as the positioning of the vehicle's blade (not shown). More particularly, the first GPS card 25 is in communication with a first satellite positioning system (not shown) for determining positioning of the earth-working machinery or vehicle, and the second GPS card 25A is in communication with a second satellite positioning system (not shown) for determining positioning of the portion of the earth-working machinery or vehicle. The first and second satellite positioning systems preferably comprising the Global Positioning System (GPS).

Although the description above contains many specificities, these should not be construed as limiting the scope of the invention but is merely providing illustrations of some of the presently preferred embodiments of this invention. Thus the scope of the invention should be determined by the appended claims in the formal application and their legal equivalence, rather than by the examples given.

I claim:

1. A control apparatus for automating the operation of machinery, said control apparatus comprising:
   a casing that defines a storage area therein,
   an integration card positioned in the storage area, said integration card defining a plurality of management ports,
   a computer processor connected to one of said plurality of management ports,
   a first GPS card connected to one of said plurality of management ports,
   a radio card connected to one of said plurality of management ports,
   an LED light board connected to one of said plurality of management ports,
   means for enabling said control apparatus with internet access, and
   a display screen in direct communication with said computer processor,
   wherein communications through the control apparatus is routed through said integration card,
   a power surge that is connected directly to said computer processor and said integration card.

2. The control apparatus as recited in claim 1, wherein said means for enabling internet access comprises a Wi-Fi card in direct communication with said computer processor.

3. The control apparatus as recited in claim 1, wherein said means for enabling internet access comprises a Bluetooth adapter in direct communication with said computer processor.

4. The control apparatus as recited in claim 1, wherein said means for enabling internet access comprises a cellular card adapter in direct communication with said computer processor.

5. The control apparatus as recited in claim 1, wherein said casing includes a display having a plurality of status LEDs appropriately connected to said LED light board, wherein one of said plurality of status LEDs is in direct communication with said computer processor, and wherein one of said plurality of status LEDs is in direct communication with said first GPS card, and wherein one of said plurality of status LEDs is in direct communication with said radio card.

6. The control apparatus as recited in claim 1, further including a second GPS card connected to one of said plurality of management ports.

7. A control apparatus for automating the operation of machinery, said control apparatus comprising:
   a casing that defines a storage area therein,
   an integration card positioned in the storage area, said integration card defining a plurality of management ports,
   a computer processor connected to one of said plurality of management ports, a first GPS card connected to one of said plurality of management ports, said first GPS card in communication with a first satellite positioning system for determining positioning of an earth-working vehicle,
a second GPS card connected to one of said plurality of management ports, said second GPS card in communication with a second satellite positioning system for determining positioning of a portion of the earth-working vehicle,
a radio card connected to one of said plurality of management ports,
an LED light board connected to one of said plurality of management ports,
means for enabling said control apparatus with internet access, and
a display screen in direct communication with said computer processor,
wherein communications through the control apparatus is routed through said integration card,
a power surge that is connected directly to said computer processor and said integration card.

8. The control apparatus as recited in claim 7, wherein said means for enabling internet access comprises a Wi-Fi card in direct communication with said computer processor.

9. The control apparatus as recited in claim 7, wherein said means for enabling internet access comprises a Bluetooth adapter in direct communication with said computer processor.

10. The control apparatus as recited in claim 7, wherein said means for enabling internet access comprises a cellular card adapter in direct communication with said computer processor.

11. The control apparatus as recited in claim 7, wherein said casing includes a display having a plurality of status LEDs appropriately connected to said LED light board, wherein one of said plurality of status LEDs is in direct communication with said computer processor, and wherein one of said plurality of status LEDs is in direct communication with said first GPS, and wherein one of said plurality of status LEDs is in direct communication with said first GPS card, and wherein one of said plurality of status LEDs is in direct communication with said second GPS card, and wherein one of said plurality of status LEDs is in direct communication with said radio card.

12. The control apparatus as recited in claim 7, wherein said first and second satellite positioning system comprises the Global Positioning System (GPS).

13. The control apparatus as recited in claim 7, wherein said casing comprising a front panel, a back panel, a pair of side panes, a top and a bottom.

14. The control apparatus as recited in claim 13, wherein said the front and back panels are constructed of a 3/8" aluminum material; and said side, top and bottom panels are constructed of a 1/4" aluminum material.

15. The control apparatus as recited in claim 7, wherein said integration card adapted to receive data signals from said first GPS card from said second GPS card and from said radio card, and sending said data signals to said computer processor.

16. The control apparatus as recited in claim 15, wherein said computer processor adapted to receive said data signals from said integration card and includes means for geometrically processing said data signals for determining positioning of the earth-working vehicle and the portion of the earth-working vehicle.

17. A control apparatus for automating the operation of machinery, said control apparatus comprising:
a casing that defines a storage area therein,
an integration card positioned in the storage area,
a computer processor connected to a first management port of said integration card,
a first GPS card connected to a second management port of said integration card, said first GPS card for determining positioning of an earth-working vehicle,
a radio card connected to a third management port of said integration card,
means for enabling said control apparatus with internet access,
a power protector connected to said computer processor and said integration card, and
wherein said integration card adapted to receive data signals from said first GPS card and said radio card, and sending said data signals to said computer processor, and
wherein said computer processor adapted to receive said data signals from said integration card and includes means for geometrically processing said data signals for determining positioning of the earth-working vehicle.

18. The control apparatus as recited in claim 17, further comprising a second GPS card connected to a fourth management port of said integration card, said second GPS card for determining positioning of a portion of the earth-working vehicle.

* * * * *